(12) United States Patent
Yudahira

(10) Patent No.: US 7,388,351 B2
(45) Date of Patent: Jun. 17, 2008

(54) CAPACITY EQUALIZING APPARATUS FOR SECONDARY BATTERIES

(75) Inventor: Hirofumi Yudahira, Ibusuki (JP)

(73) Assignee: Panasonic EV Energy Co., Ltd., Shizuoka (JP)

( * ) Notice: Subject to any disclaimer, the term of this patent is extended or adjusted under 35 U.S.C. 154(b) by 155 days.

(21) Appl. No.: 11/129,001

(22) Filed: May 13, 2005

(65) Prior Publication Data

US 2005/0269990 A1 Dec. 8, 2005

(30) Foreign Application Priority Data

May 19, 2004 (JP) .............................. 2004-149067

(51) Int. Cl.
*H02J 7/00* (2006.01)

(52) U.S. Cl. ...................... 320/119; 320/118; 320/116; 320/132

(58) Field of Classification Search ................. 320/119, 320/118, 116, 132
See application file for complete search history.

(56) References Cited

U.S. PATENT DOCUMENTS 5,998,969 A 12/1999 Tsuji et al.

6,297,618 B2 * 10/2001 Emori et al. ................ 320/132

FOREIGN PATENT DOCUMENTS

JP 06-253463 9/1994

* cited by examiner

*Primary Examiner*—Gary L Laxton
*Assistant Examiner*—Yalkew Fantu
(74) *Attorney, Agent, or Firm*—Workman Nydegger

(57) ABSTRACT

A small and low-cost capacity equalizing apparatus for equalizing the capacities of battery blocks constituting an assembled battery, each battery block comprising one or multiple secondary batteries and the battery blocks being connected in series.

The capacity equalizing apparatus in accordance with the present invention comprises an assembled battery, n discharge devices and a controller. The assembled battery has a configuration wherein n battery blocks (n is a positive integer of 2 or more), each comprising one or multiple secondary batteries, are connected in series. The n discharge devices, each connected across the positive and negative electrode terminals of each of the n battery blocks, discharge the secondary batteries inside the respective battery blocks. The controller has a first control section to which the battery blocks are electrically connected and a second control section electrically insulated from the first control section. The controller individually controls at least two of the discharge devices.

10 Claims, 5 Drawing Sheets

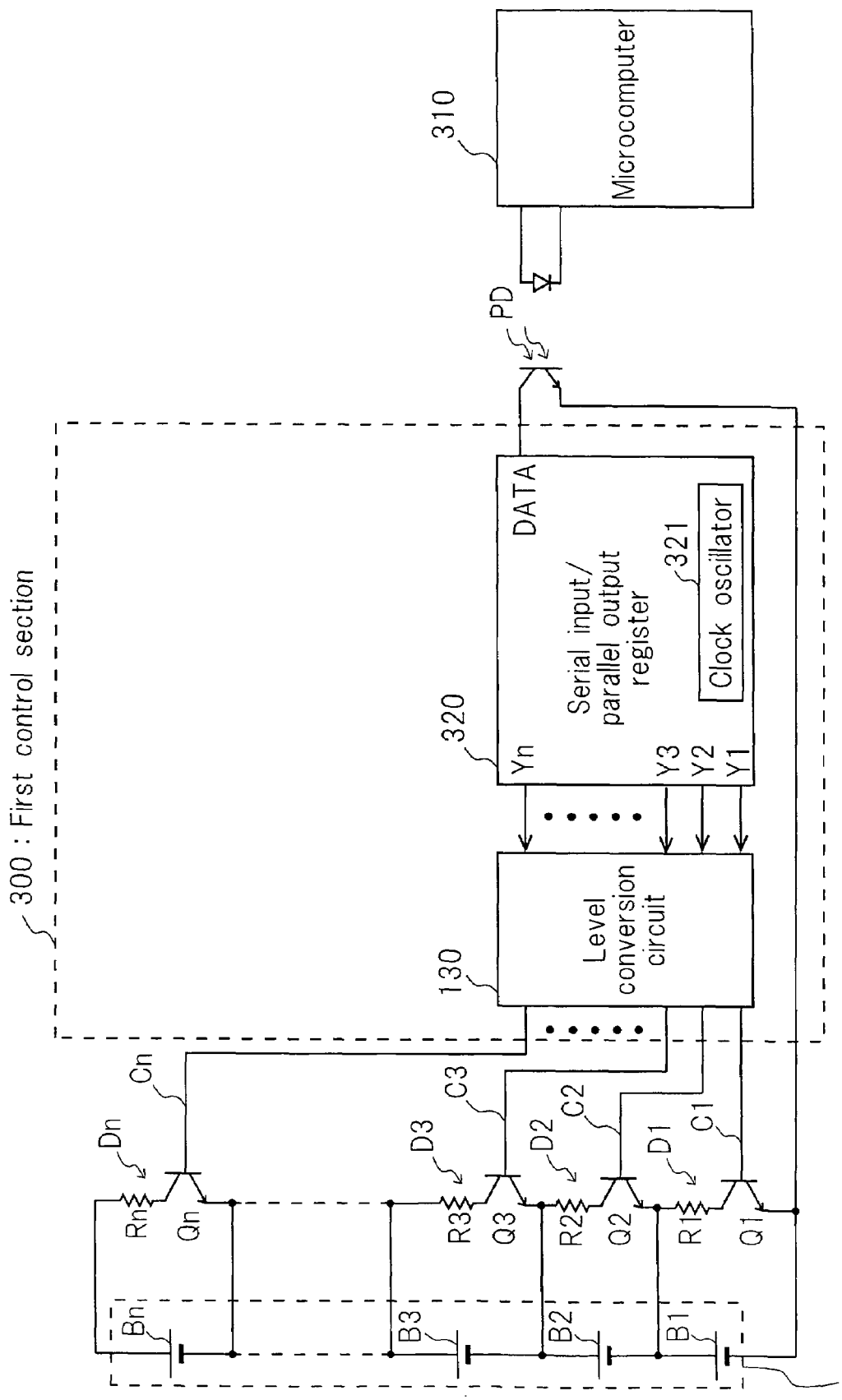
F I G. 4

CAPACITY EQUALIZING APPARATUS FOR SECONDARY BATTERIES

BACKGROUND OF THE INVENTION

The present invention relates to a capacity equalizing apparatus for secondary batteries.

In recent years, attention is being given to an enclosed nickel-metal hydride battery (hereafter referred to as a "nickel-hydrogen battery" in this description) being excellent in basic characteristics, such as energy density, output density, cycle life. Development has been advancing to make this nickel-hydrogen battery practical as a power source for motors and as a drive source for various loads in electric vehicles, such as pure electric vehicles (PEVs) and hybrid electric vehicles (HEVs). In the case that this nickel-hydrogen battery is used as a power source for electric vehicles, a battery capacity of approximately 50 to 120 Ah and a total voltage of approximately 100 to 350 V are required to obtain a predetermined drive output. The output voltage of a cell (one nickel-hydrogen cell), the minimum unit constituting the nickel-hydrogen battery, is approximately 1.2 V. Hence, an assembled battery comprising multiple battery blocks, each battery block having one or multiple cells and the battery blocks being connected in series, is used to obtain a desired total voltage.

The temperatures of the cells constituting the assembled battery are not uniform. In particular, in an environment in which the assembled battery is used in a vehicle, temperature differences are apt to occur among the cells. Furthermore, the charging level and the charging efficiency (the ratio of the charged electric quantity to the supplied electric quantity) are different with each cell depending on production process and usage conditions after the production. For these reasons, the cells constituting the assembled battery have variations for each cell in the actual charged state (the ratio obtained by subtracting the discharged electric quantity from the fully charged state of the cell) and the actual capacity (dischargeable electric quantity). If the assembled battery being varying in cell capacity as described above is charged and discharged repeatedly as one unit, cells having small capacities are overcharged or over discharged, and the variation in the capacity among the cells increases. As a result, the range of the capacity being usable as the capacity of the assembled battery is getting narrow. In other words, the service life of the assembled battery is apparently shortened significantly. Hence, for the purpose of preventing the cells constituting the assembled battery from being overcharged or over discharged, it is important to carry out a control to equalize the capacities of the cells or the battery blocks of the assembled battery.

Japanese Laid-open Patent Application Hei 6-253463 has disclosed a battery charging method in accordance with a conventional example, wherein multiple batteries are connected in series and charged. In this method in accordance with the conventional example, a battery pack (assembled battery) comprising batteries connected in series is first fully charged. Then, the voltage of each battery is detected, and a battery having a high voltage is discharged so that the voltage differences among the batteries become small. This prevents the voltage of either one of the batteries from becoming abnormally high and prevents the battery from being overcharged. Since the voltage of a battery is nearly proportional to its capacity, the variation in the capacity among the batteries is equalized.

Furthermore, Japanese Laid-open Patent Application Hei 6-253463 has also disclosed a circuit in accordance with a conventional example, wherein a discharge means comprising a discharge resistance and a discharge switch connected in series is connected in parallel with each battery to individually discharge each of the batteries constituting the battery pack. A microcomputer detects the voltage of each battery on the basis of a signal input to a voltage detection terminal connected to the positive electrode terminal of each battery. The microcomputer then directly on-off controls the discharge switch.

In an electric vehicle, a high-voltage circuit including an assembled battery is insulated from the chassis to prevent risks. On the other hand, a low-voltage circuit including devices, such as a microcomputer for controlling the charging and discharging of the assembled battery, uses the potential of the chassis as a reference potential. Hence, it is necessary to provide a circuit configuration wherein the high voltage generated by the battery blocks or cells constituting the assembled battery is not applied directly to the low-voltage circuit including devices, such as the microcomputer.

In the case that the circuit in accordance with the above-mentioned conventional example is installed in an electric vehicle, for the purpose of providing sufficient insulation between the low-voltage circuit and the high-voltage circuit and transmitting signals from the low-voltage circuit to the high-voltage circuit, it is necessary to use, for example, large and expensive transmission devices, the input and output terminals of which are insulated from each other. The transmission device is, for example, a photocoupler, the light-emitting diode and the light-sensitive diode of which are insulated from each other. In the above-mentioned conventional example, since the number of the transmission devices, the input and output terminals of which are insulated from each other, is required to be equal to at least the number of the battery blocks or cells, a capacity equalizing apparatus including the circuit becomes high in cost and large in size.

For the purpose of solving the problem encountered in the above-mentioned conventional example, the present invention is intended to provide a small and low-cost capacity equalizing apparatus for equalizing the capacities of battery blocks constituting an assembled battery, each battery block comprising one or multiple secondary batteries and the battery blocks being connected in series.

BRIEF SUMMARY OF THE INVENTION

For the purpose of solving the problem encountered in the above-mentioned conventional example, the present invention has configurations described below.

A capacity equalizing apparatus for secondary batteries in accordance with the first aspect of the present invention comprises an assembled battery having n battery blocks (n is a positive integer of 2 or more), each battery block comprising one or multiple secondary batteries and the battery blocks being connected in series; n discharge devices, each connected across the positive and negative electrode terminals of each of the battery blocks, for discharging the secondary batteries inside the respective battery blocks; and a controller for individually controlling the discharge devices, wherein the controller has a first control section to which the battery blocks are electrically connected and a second control section electrically insulated from the first control section, and the controller controls at least two of the discharge devices.

In the capacity equalizing apparatus in accordance with the conventional example, one controller controls one of the discharge devices. Hence, the number of transmission devices, the input and output terminals of which are insulated from each other, for transmitting signals from the second control section (for example, a microcomputer) serving as the low-voltage circuit of the capacity equalizing apparatus to the first control section serving as the high-voltage circuit thereof is required to be equal to or more than the number of the discharge devices.

The controller of the capacity equalizing apparatus in accordance with the present invention controls at least two of the discharge devices. Hence, the number of the transmission devices, the input and output terminals of which are insulated from each other, for transmitting signals from the second control section (for example, a microcomputer) of the capacity equalizing apparatus to the first control section thereof can be reduced by at least one. In general, the transmission device, the input and output terminals of which are insulated from each other, is expensive and large in circuit size. With the present invention, it is possible to accomplish a capacity equalizing apparatus, the cost and circuit size of which are reduced in comparison with the conventional example.

A capacity equalizing apparatus for secondary batteries in accordance with the second aspect of the present invention is the above-mentioned capacity equalizing apparatus for secondary batteries, wherein signals transmitted from the second control section to the first control section are sent as serial data, the serial data is transmitted from the second control section to the first control section via a photocoupler, the light-emitting diode and the light-sensitive diode of which are electrically insulated from each other, and the first control section sends the transmitted serial data to the corresponding discharge devices in parallel.

In the capacity equalizing apparatus in accordance with the present invention, the control signals for the discharge devices are sent as serial data from the second control section to the first control section. Hence, the number of the transmission devices to be used, the input and output terminals of which are insulated from each other, can be reduced drastically. In general, the transmission device, the input and output terminals of which are insulated from each other, is expensive and large in circuit size. With the present invention, it is possible to accomplish a capacity equalizing apparatus, the cost and circuit size of which are reduced significantly in comparison with the conventional example.

A capacity equalizing apparatus for secondary batteries in accordance with the third aspect of the present invention is the above-mentioned capacity equalizing apparatus for secondary batteries, wherein the serial data has start bits and data bits for on-off controlling the discharge devices; and the first control section comprises a serial input/parallel output register having a data input terminal to which the serial data is input, multiple parallel output terminals from which the data bits are output and a clock oscillator for generating a clock signal synchronized with the serial data and used for reading at least the data bits among the serial data, and a level conversion circuit for converting the voltage level of each data bit output from each of the parallel output terminals into a voltage level capable of on-off controlling the discharge device corresponding to each data bit and for outputting the voltage-converted signal to the corresponding discharge device.

In the capacity equalizing apparatus in accordance with the present invention, signals from the second control section (for example, a microcomputer) are input to only the data input terminal. The serial input/parallel output register generates the clock signal synchronized with the serial input data having the start bits input from the second control section and reads the serial input data. Hence, a clock signal input terminal to which the clock signal from the second control section is input is not required in the capacity equalizing apparatus in accordance with the present invention. Therefore, this configuration requires only one transmission device, the input and output terminals of which are insulated from each other, for providing electrical insulation between the first control section including the assembled battery and the low-voltage circuit including the second control section of the capacity equalizing apparatus. In general, the transmission device, the input and output terminals of which are insulated from each other, is expensive and large in circuit size. With the present invention, it is possible to accomplish a capacity equalizing apparatus, the cost and circuit size of which are reduced significantly in comparison with the conventional example.

In the case that the number of bits in the data bits is large, it is preferable that a synchronizing signal for performing resynchronization should be inserted at every number of predetermined bits. In the case that the number of bits in the data bits is large, the serial input/parallel output register may have a danger of misreading the rearmost data of the serial input data owing to a slight deviation between the clock frequency at which the second control section outputs data and the frequency of the internal clock of the serial input/parallel output register at which the data is read. For example, a synchronizing signal with two bits (1 and 0) is inserted at every 8 data bits. The clock oscillator of the serial input/parallel output register can readjust the timing of the clock signal at the falling edge (from 1 to 0) of the synchronizing signal. Hence, even if the deviation between the clock frequency at which the second control section outputs the data and the frequency of the internal clock of the serial input/parallel output register at which the data is read is up to 5%, the serial input/parallel output register has no danger of misreading the serial input data.

A capacity equalizing apparatus for secondary batteries in accordance with the fourth aspect of the present invention is the above-mentioned capacity equalizing apparatus for secondary batteries, wherein the controller comprises a serial input/parallel output register having a data input terminal to which the serial data for on-off controlling the discharge devices is input, a reset terminal to which a reset signal for identifying the head of the serial data is input, multiple parallel output terminals from which the data bits are output and a clock oscillator for generating a clock signal synchronized with the serial data and used for reading at least the data bits among the serial data, and a level conversion circuit for converting the voltage level of each data bit output from each of the parallel output terminals into a voltage level capable of on-off controlling the discharge device corresponding to each data bit and for outputting the voltage-converted signal to the corresponding discharge device.

In the capacity equalizing apparatus in accordance with the present invention, signals from the second control section (for example, a microcomputer) are input to only the data input terminal and the reset terminal. The serial input/parallel output register generates the clock signal synchronized with the serial input data and reads the serial input data. Hence, a clock signal input terminal to which the clock signal from the second control section is input is not required in the capacity equalizing apparatus in accordance with the present invention. Therefore, this configuration requires only two transmission devices, the input and output terminals of which are insulated from each other, for providing electrical insulation between the high-voltage circuit including the assembled battery and the second control section serving as the low-voltage circuit. In general, the transmission device, the input and output terminals of which are insulated from each other, is expensive and large in circuit size. With the present invention, it is possible to accomplish a capacity equalizing apparatus, the cost and circuit size of which are reduced significantly in comparison with the conventional example.

A capacity equalizing apparatus for secondary batteries in accordance with the fifth aspect of the present invention is the above-mentioned capacity equalizing apparatus for secondary batteries, wherein the controller comprises a serial input/parallel output register having a clock signal input terminal to which a clock signal is input, a data input terminal to which the serial data, formed of data synchronized with the clock signal and used for on-off controlling the discharge devices, is input, a reset terminal to which a reset signal for identifying the head of the serial data is input and multiple parallel output terminals from which the data bits are output, and a level conversion circuit for converting the voltage level of each data bit output from each of the parallel output terminals into a voltage level capable of on-off controlling the discharge device corresponding to each data bit and for outputting the voltage-converted signal to the corresponding discharge device.

In the capacity equalizing apparatus in accordance with the present invention, signals from the second control section (for example, a microcomputer) are input to only the data input terminal, the reset terminal and the clock signal input terminal. The serial input/parallel output register carries out synchronous communication with the second control section. Therefore, this configuration requires only three transmission devices, the input and output terminals of which are insulated from each other, for providing electrical insulation between the high-voltage circuit including the assembled battery and the second control section serving as the low-voltage circuit. In general, the transmission device, the input and output terminals of which are insulated from each other, is expensive and large in circuit size. With the present invention, it is possible to accomplish a capacity equalizing apparatus, the cost and circuit size of which are reduced significantly in comparison with the conventional example.

A capacity equalizing apparatus for secondary batteries in accordance with the sixth aspect of the present invention is the above-mentioned capacity equalizing apparatus for secondary batteries, wherein the serial data further has stop bits, and the serial input/parallel output register outputs the serial data from the parallel output terminals when the stop bits are input.

In the case that the first control section of the capacity equalizing apparatus in accordance with the present invention is integrated into an IC for example, it is preferable that the IC should be incorporated in the capacity equalizing apparatus having any given number of battery blocks. The microcomputer constituting the second control section outputs the serial input data including the data bits (the number of which is any given number of bits) respectively corresponding to the battery blocks and the stop bits, whereby the capacity equalizing apparatus in accordance with the present invention outputs the input data from the parallel output terminals at the timing when the data bits are read. The present invention thus accomplishes a capacity equalizing apparatus having versatility.

A capacity equalizing apparatus for secondary batteries in accordance with the seventh aspect of the present invention is the above-mentioned capacity equalizing apparatus for secondary batteries, wherein a circuit, constituting the level conversion circuit, for converting the voltage level of a binary data bit output from at least one of the parallel output terminals into a voltage level capable of on-off controlling the discharge device corresponding to the data bit, includes a circuit for converting either one of binary voltages output from the serial input/parallel output register into a first voltage serving as the voltage at the connection point between the ath battery block (a is a positive integer of 2 or more) and the (a+1)th battery block from the reference potential of the serial input/parallel output register and for further converting the first voltage into a second voltage serving as the voltage at the connection point between the (a+b)th battery block (b is a positive integer of 1 or more) and the (a+b+1)th battery block.

For example, in an assembled battery for an electric vehicle, there is a difference of several hundred volts between the voltage level of the control signal input by a discharge device for discharging a battery block on the high-potential side and the voltage level of the control signal input by a discharge device for discharging a battery block on the low-potential side. However, in the case that the level conversion circuit for generating the control signals is configured using circuit devices having a high withstand voltage, such a configuration increases the circuit size and cost of the capacity equalizing apparatus. The level conversion circuit of the capacity equalizing apparatus in accordance with the present invention can easily be integrated into an IC using general-purpose semiconductor devices having a low withstand voltage. The present invention can thus accomplish a capacity equalizing apparatus that is lower in cost.

Either one of the binary voltages output from the serial input/parallel output register may be converted directly into the first voltage. Alternatively, it may also possible that the voltage is converted once into, for example, a third voltage serving as the voltage at the connection point between the first battery block and the second battery block from the reference potential (ground in a typical case) of the serial input/parallel output register, and then the third voltage is converted into the first voltage.

The present invention has an effect capable of accomplishing a capacity equalizing apparatus that is small in size and low in cost.

The capacity equalizing apparatus in accordance with the present invention is useful as a capacity equalizing apparatus having an assembled battery outputting a high voltage and being used for electric vehicles and the like.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 4 is a block diagram showing a capacity equalizing apparatus in accordance with Embodiment 3 of the present invention;

FIG. 5 is a timing chart applicable to the capacity equalizing apparatus in accordance with Embodiment 3 of the present invention.

It will be recognized that some or all of the figures are schematic representations for purposes of illustration and do not necessarily depict the actual relative sizes or locations of the elements shown.

DETAILED DESCRIPTION OF THE INVENTION

Embodiments specifically exemplifying the best mode for carrying out the present invention will be described below referring to the accompanying drawings.

Embodiment 1

Figure 1:
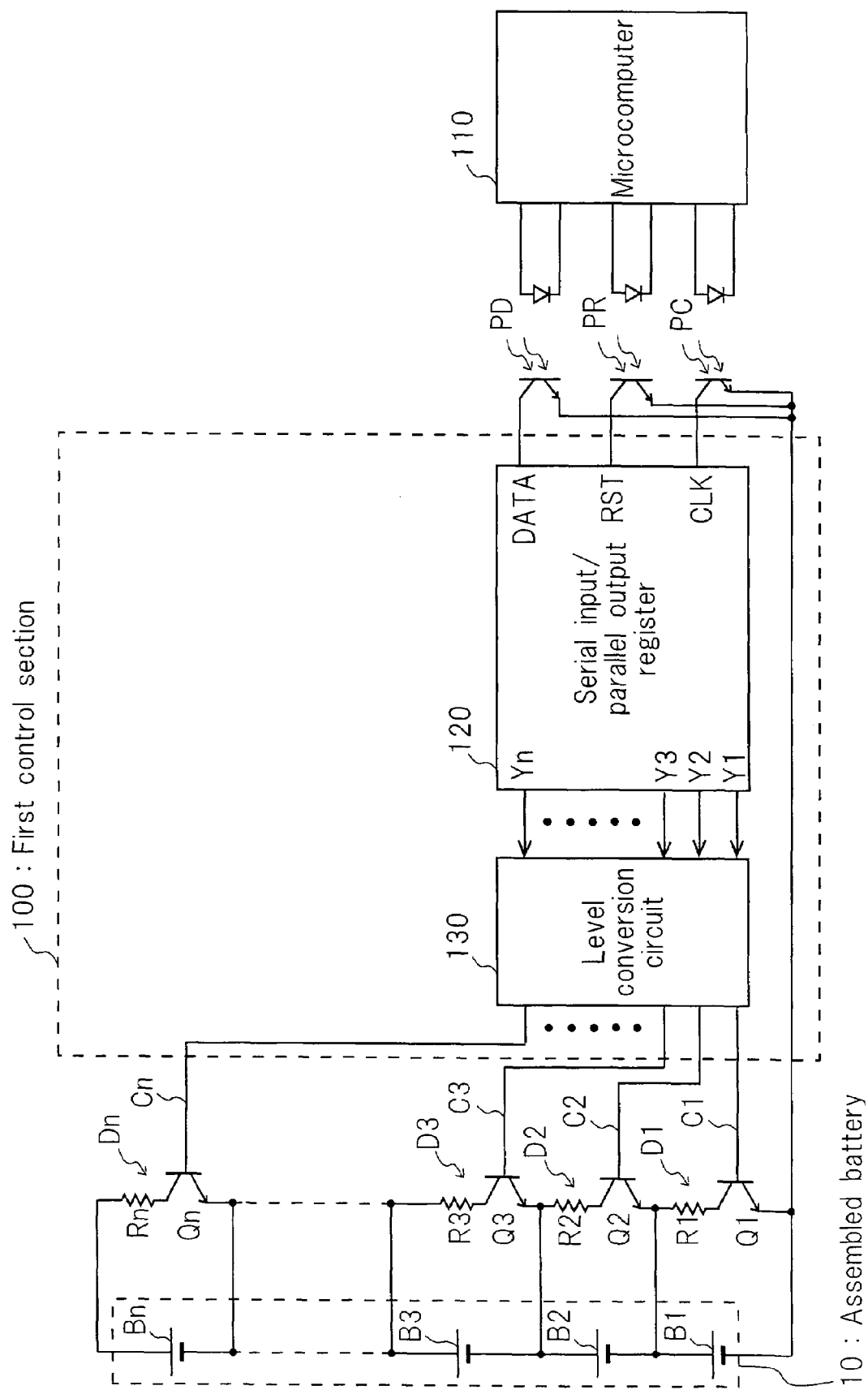
FIG. 1 is a block diagram showing a capacity equalizing apparatus in accordance with Embodiment 1 of the present invention.
Figure 2:
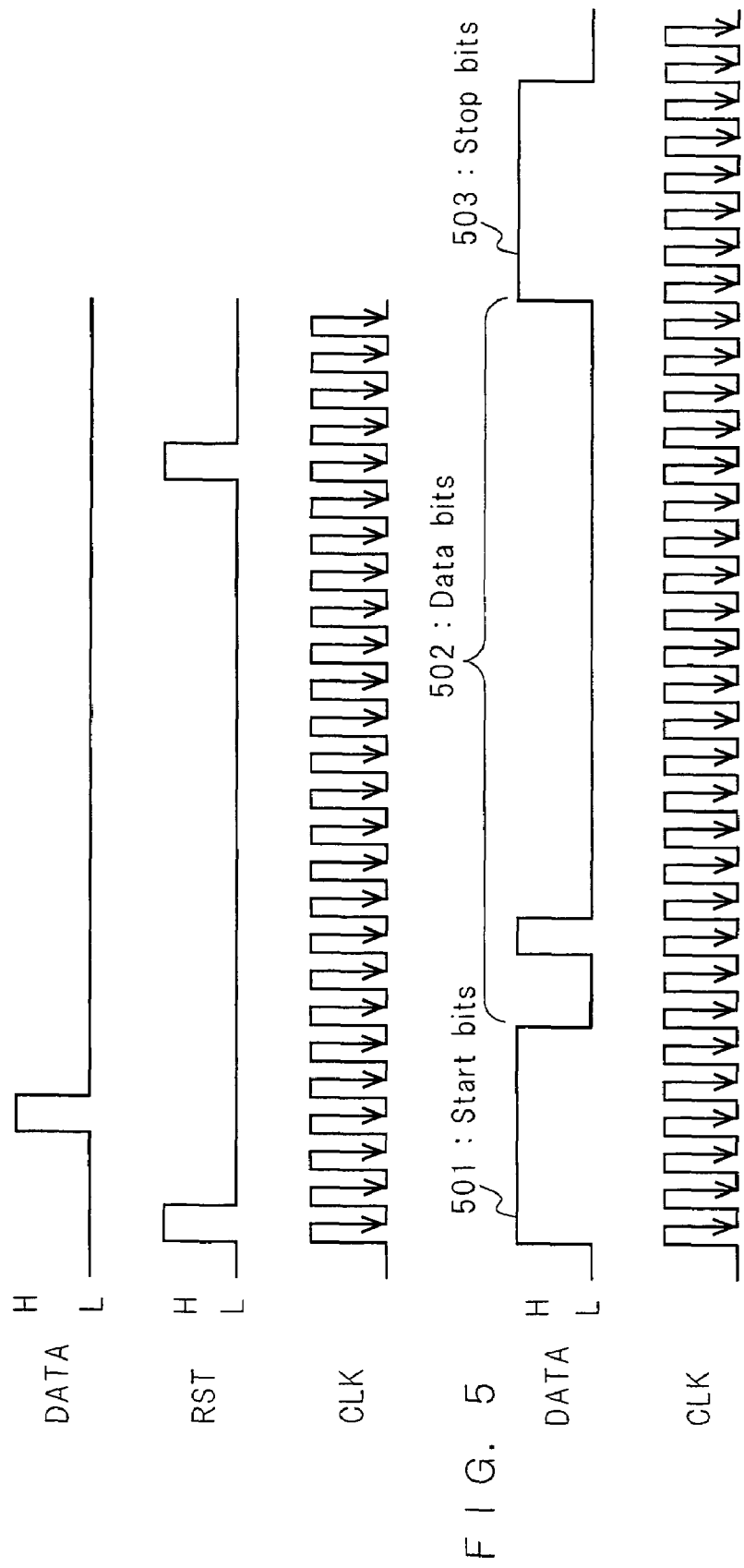
FIG. 2 is a timing chart applicable to the capacity equalizing apparatuses in accordance with Embodiment 1 and Embodiment 2 of the present invention.

A capacity equalizing apparatus in accordance with Embodiment 1 of the present invention will be described using FIGS. 1 and 2. FIG. 1 is a block diagram showing the capacity equalizing apparatus in accordance with Embodiment 1 of the present invention. FIG. 2 is a timing chart applicable to the capacity equalizing apparatus in accordance with Embodiment 1 of the present invention.

The capacity equalizing apparatus in accordance with Embodiment 1 comprises a microcomputer 110 constituting a second control section serving as a low-voltage circuit, photocouplers PD, PR and PC, the light-emitting diode and the light-sensitive diode of which are insulated from each other, a first control section 100 serving as a high-voltage circuit, n discharge devices D1 to Dn, and an assembled battery 10. The microcomputer 110 and the first control section 100 constitute a controller. The capacity equalizing apparatus in accordance with Embodiment 1 is installed in an electric vehicle. The DC power of the assembled battery 10 is converted into AC power by an inverter (not shown), and the AC power drives a motor (not shown), whereby the electric vehicle runs. The photocoupler is a transmission device, the input and output terminals of which are insulated from each other.

Signals from the microcomputer 110 are input to the first control section 100 in accordance with Embodiment 1 via the photocouplers PD, PR and PC and transmitted to the n discharge devices D1 to Dn. The n discharge devices D1 to Dn individually discharge battery blocks B1 to Bn constituting the assembled battery 10 according to instructions from the microcomputer 110.

The assembled battery 10 has a configuration wherein the n battery blocks B1 to Bn (n is a positive integer of 2 or more. n=20 in FIG. 1) are connected in series. Furthermore, each of the battery blocks B1 to Bn comprises multiple (12) secondary battery cells connected in series. With this configuration, the assembled battery 10 becomes an assembled battery having 240 cells in total. In Embodiment 1, each cell is a nickel-hydrogen battery having a nominal voltage of 1.2 V. Hence, 14.4 V is obtained from each battery block, and a total nominal voltage of 288 V is obtained from the assembled battery 10. In this description, the high-potential side of the assembled battery 10 is referred to as "high-order" and the low-potential side thereof is referred to as "low-order." Furthermore, the lowest-order battery block is designated by B1, and the highest-order battery block is designated by Bn.

The microcomputer 110 searches for a battery block having a high voltage by measuring the voltages of the battery blocks B1 to Bn using a voltage measurement circuit not shown. Then, the microcomputer 110 generates serial data, a reset signal and a clock signal required for discharging the battery block having the high voltage and outputs them as optical signals to the first control section 100 via the photocouplers PD, PR and PC.

The microcomputer 110 has a clock oscillator (not shown) and generates the serial data at the rising edge timing of the clock signal generated by the clock oscillator. Furthermore, before transmitting the serial data, the microcomputer 110 outputs the reset signal. The Low level of the reset signal is used as a reference, and the reset signal is a 1-bit signal for indicating the start of the serial data. The low level of the serial data is used as a reference. After the reset signal is transmitted, the transmission of the serial data is started together with the clock signal. The serial data becomes High level (a charge command) or Low level (a non-charge command) at the rising edge timing of the clock signal corresponding to the battery blocks B1 to Bn to be discharged. FIG. 2 shows examples of the serial data (DATA), the reset signal (RST) and the clock signal (CLK) in the case that the third battery block B3 is discharged.

The serial data (DATA), the reset signal (RST) and the clock signal (CLK) output from the microcomputer 110 are transmitted to the first control section 100 via the photocouplers PD, PR and PC, respectively.

The first control section 100 comprises a serial input/parallel output register 120 and a level conversion circuit 130.

The serial input/parallel output register 120 has a data input terminal DATA, a reset terminal RST, a clock signal input terminal CLK and parallel output terminals Y1 to Yn, the number of which is equal to the number (n) of the battery blocks B1 to Bn. The serial data from the microcomputer 110 is input to the serial input/parallel output register 120. The serial data, the reset signal and the clock signal from the microcomputer 110 are sent to the data input terminal DATA, the reset terminal RST and the clock signal input terminal CLK, respectively, via the collector terminals of the phototransistors respectively constituting the photocouplers PD, PR and PC.

The serial input/parallel output register 120 receives the reset signal, detects the falling edge of the clock signal sent to the clock signal input terminal CLK and receives the serial data. The serial input/parallel output register 120 then outputs the respective data bits of the serial data from the parallel output terminals Y1 to Yn at the timing when a predetermined number of bits of data are captured. Among the parallel output terminals Y1 to Yn, only the output terminal corresponding to the battery block to be discharged is switched to High level. For example, in the case that the serial data, the reset signal and the clock signal shown in FIG. 2 are input to the serial input/parallel output register 120, only the output terminal Y3 is switched to High level. The emitter terminals of the phototransistors respectively constituting the photocouplers PD, PR and PC and the ground terminal of the serial input/parallel output register 120 are connected to the negative electrode terminal of the lowest-order battery block B1.

The microcomputer 110 is electrically insulated from the high-voltage assembled battery 10 by the transmission devices including the photocouplers PD, PR and PC, the input and output terminals of which are insulated from each other.

The discharge device Dn comprises a discharge resistor Rn and an npn transistor Qn connected to each other in series. The discharge device Dn is connected in parallel with the battery block Bn. One terminal of the discharge resistor Rn is connected to the positive electrode terminal of the battery block Bn, and the other terminal is connected to the collector terminal of the npn transistor Qn. The emitter terminal of the npn transistor Qn is connected to the negative electrode terminal of the battery block Bn. When the npn transistor Qn is turned on by a control signal Cn input to the base terminal of the transistor Qn, a current flows in the discharge resistor Rn, and the power of the battery block Bn is consumed. The discharge current of the battery block Bn is adjusted using the discharge resistor Rn. The other discharge devices D1, D2, D3, . . . and Dn−1 have a configuration similar to that of the discharge device Dn.

The level conversion circuit 130 receives the signals output from the parallel output terminals Y1 to Yn of the serial input/parallel output register 120 and converts them into control signals C1 to Cn for on-off controlling the npn transistors Q1 to Qn constituting the discharge devices D1 to Dn, and then outputs the control signals. The output terminals of the level conversion circuit 130 are respectively connected to the base terminals of the npn transistors Q1 to Qn. In Embodiment 1, the voltage level of the control signal Cn for turning on the highest-order transistor Qn is approximately 278 V. On the other hand, the voltage levels of the signals input to the level conversion circuit 130 are approximately 5 V. The level conversion circuit 130 converts the voltage levels of the input signals into the voltage levels capable of driving the discharge devices D1 to Dn and outputs the control signals having the voltage levels to the discharge devices D1 to Dn. The level conversion circuit 130 may comprise circuit devices having a high withstand voltage of up to approximately 278 V, or the circuit may comprise low-cost circuit devices having a low withstand voltage, as in a level conversion circuit 430 in accordance with Embodiment 4 (as described later).

As described above, the first control section 100 comprises the serial input/parallel output register 120 having the data input terminal DATA, the reset terminal RST and the clock signal input terminal CLK as input terminals. To the respective input terminals, the transmission devices, the input and output terminals of which are insulated from each other, are connected. With this configuration, the number of the expensive transmission devices can be reduced significantly in comparison with the conventional example. The capacity equalizing apparatus in accordance with Embodiment 1 is thus small in size and low in cost in comparison with the conventional example.

Embodiment 2

Figure 3:
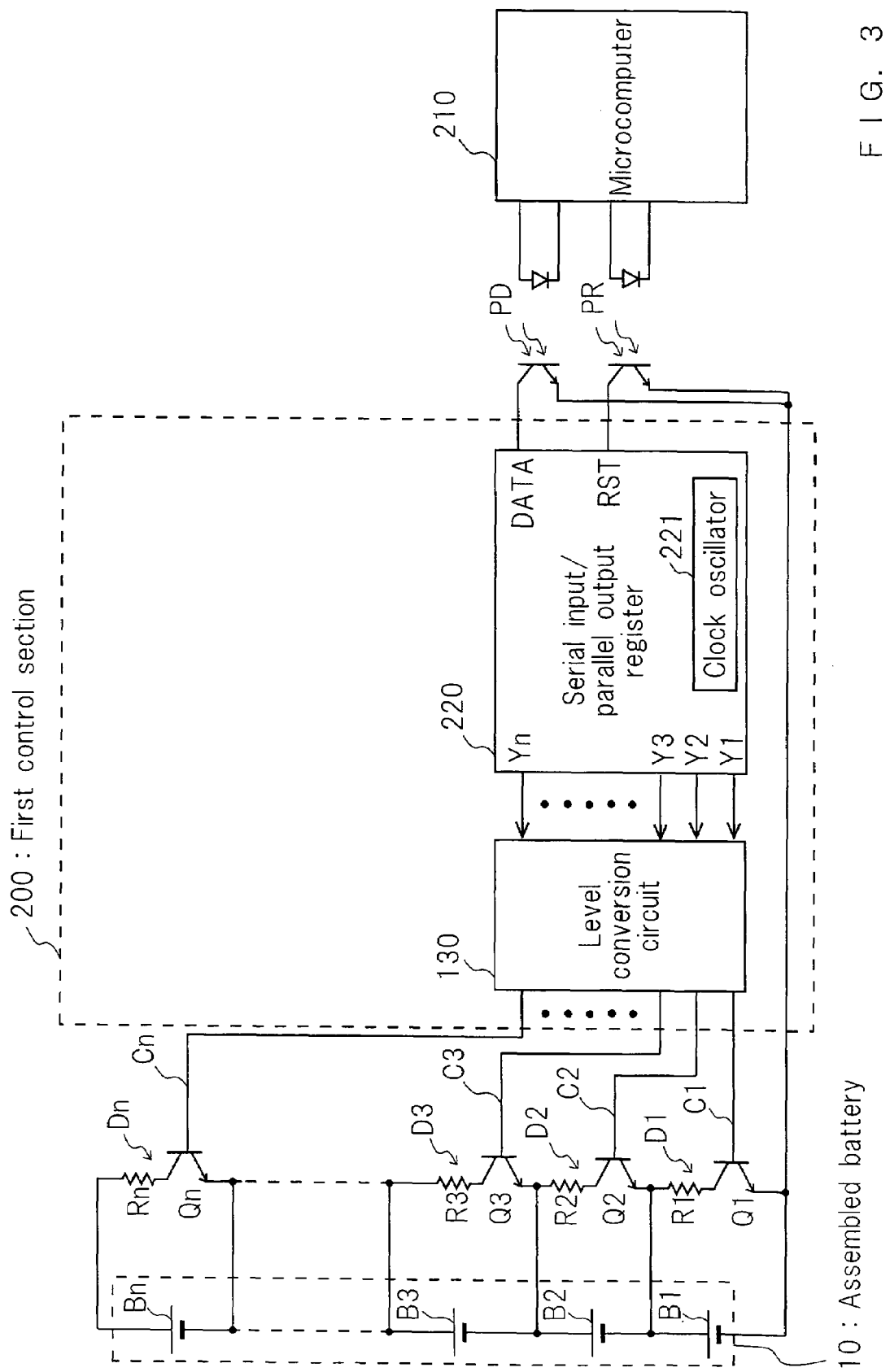
FIG. 3 is a block diagram showing the capacity equalizing apparatus in accordance with Embodiment 2 of the present invention.

A capacity equalizing apparatus in accordance with Embodiment 2 of the present invention will be described using FIGS. 2 and 3. FIG. 3 is a block diagram showing the capacity equalizing apparatus in accordance with Embodiment 2 of the present invention. FIG. 2 is a timing chart applicable to the capacity equalizing apparatus in accordance with Embodiment 2 of the present invention.

The capacity equalizing apparatus in accordance with Embodiment 2 comprises a microcomputer 210 constituting a second control section serving as a low-voltage circuit, photocouplers PD and PR, the light-emitting diode and the light-sensitive diode of which are insulated from each other, a first control section 200 serving as a high-voltage circuit, n discharge devices D1 to Dn, and an assembled battery 10. The microcomputer 210 and the first control section 200 constitute a controller. The capacity equalizing apparatus in accordance with Embodiment 2 does not have a phototransistor constituting a photocoupler PC. The capacity equalizing apparatus in accordance with Embodiment 2 is installed in an electric vehicle. The DC power of the assembled battery 10 is converted into AC power by an inverter (not shown), and the AC power drives a motor (not shown), whereby the electric vehicle runs. The photocoupler is a transmission device, the input and output terminals of which are insulated from each other.

The first control section 200 in accordance with Embodiment 2 has a configuration wherein the serial input/parallel output register 120 of the first control section 100 in accordance with Embodiment 1 is replaced with a serial input/parallel output register 220. In other respects, the configuration is similar to that of the first control section 100 (FIG. 1). Blocks similar or equivalent to those shown in FIG. 1 are designated by the same numerals, and their descriptions are omitted.

Signals from the microcomputer 210 are input to the first control section 200 in accordance with Embodiment 2 via the photocouplers PD and PR and transmitted to the n discharge devices D1 to Dn. The n discharge devices D1 to Dn individually discharge battery blocks B1 to Bn constituting the assembled battery 10 according to instructions from the microcomputer 210.

The microcomputer 210 searches for a battery block having a high voltage by measuring the voltages of the battery blocks B1 to Bn using a voltage measurement circuit not shown. Then, the microcomputer 210 generates serial data and a reset signal required for discharging the battery block having the high voltage and outputs them as optical signals to the first control section 200.

The microcomputer 210 has a clock oscillator (not shown) and generates the serial data and the reset signal at the rising edge timing of the clock signal generated by the clock oscillator. FIG. 2 shows examples of the serial data (DATA), the reset signal (RST) and the clock signal (CLK) in the case that the third battery block B3 is discharged.

The serial data (DATA) and the reset signal (RST) output from the microcomputer 210 are transmitted to the first control section 200 via the photocouplers PD and PR, respectively.

The first control section 200 comprises a serial input/parallel output register 220 and a level conversion circuit 130.

The serial input/parallel output register 220 has a clock oscillator 221, a data input terminal DATA, a reset terminal RST and parallel output terminals Y1 to Yn, the number of which is equal to the number (n) of the battery blocks B1 to Bn. The serial data from the microcomputer 210 is input to the serial input/parallel output register 220. The serial data and the reset signal from the microcomputer 210 are sent to the data input terminal DATA and the reset terminal RST, respectively, via the collector terminals of the phototransistors respectively constituting the photocouplers PD and PR.

In Embodiment 2, the mutual timing relationship between the reset signal and the serial data is determined to be constant. When the reset signal is input, the clock oscillator 221 of the serial input/parallel output register 220 outputs a clock signal that is synchronized with the rising edge of the reset signal. The oscillation frequency of the clock oscillator 221 is set so as to be identical to the clock frequency at which the microcomputer 210 outputs the serial data.

The serial input/parallel output register 220 receives the reset signal and also receives the serial data at the falling edge of the clock signal output from the clock oscillator 221. The serial input/parallel output register 220 then outputs the respective data bits of the serial data from the parallel output terminals Y1 to Yn at the timing when a predetermined number of bits of data are captured. Among the parallel output terminals Y1 to Yn, only the output terminal corresponding to the battery block to be discharged is switched to High level. For example, in the case that the serial data and the reset signal shown in FIG. 2 are input to the serial input/parallel output register 220, only the output terminal Y3 is switched to High level. The emitter terminals of the phototransistors respectively constituting the photocouplers PD and PR are connected to the negative electrode terminal of the lowest-order battery block B1.

The microcomputer 210 is electrically insulated from the high-voltage assembled battery 10 by the transmission devices including the photocouplers PD and PR, the input and output terminals of which are insulated from each other.

As described above, the first control section 200 comprises the serial input/parallel output register 220 having the data input terminal DATA and the reset terminal RST as input terminals. To the respective input terminals, the transmission devices, the input and output terminals of which are insulated from each other, are connected. With this configuration, the number of the expensive transmission devices can be reduced significantly in comparison with the conventional example. The number of the expensive transmission devices in the capacity equalizing apparatus in accordance with Embodiment 2 is less by one than that in the capacity equalizing apparatus in accordance with Embodiment 1. The capacity equalizing apparatus in accordance with Embodiment 2 is thus small in size and low in cost in comparison with the capacity equalizing apparatus in accordance with Embodiment 1.

Embodiment 3

A capacity equalizing apparatus in accordance with Embodiment 3 of the present invention will be described using FIGS. 4 and 5. FIG. 4 is a block diagram showing the capacity equalizing apparatus in accordance with Embodiment 3 of the present invention. FIG. 5 is a timing chart applicable to the capacity equalizing apparatus in accordance with Embodiment 3 of the present invention.

The capacity equalizing apparatus in accordance with Embodiment 3 comprises a microcomputer 310 constituting a second control section serving as a low-voltage circuit, a photocoupler PD, the light-emitting diode and the light-sensitive diode of which are insulated from each other, a first control section 300 serving as a high-voltage circuit, n discharge devices D1 to Dn, and an assembled battery 10. The microcomputer 310 and the first control section 300 constitute a controller. The capacity equalizing apparatus in accordance with Embodiment 3 does not have phototransistors constituting photocouplers PR and PC. The capacity equalizing apparatus in accordance with Embodiment 3 is installed in an electric vehicle. The DC power of the assembled battery 10 is converted into AC power by an inverter (not shown), and the AC power drives a motor (not shown), whereby the electric vehicle runs. The photocoupler is a transmission device, the input and output terminals of which are insulated from each other.

The capacity equalizing apparatus in accordance with Embodiment 3 has a configuration wherein the serial input/parallel output register 220 of the capacity equalizing apparatus in accordance with Embodiment 2 is replaced with a serial input/parallel output register 320, and the phototransistor constituting a photocoupler PR is eliminated. In other respects, the configuration is similar to that of the capacity equalizing apparatus (FIG. 3) in accordance with Embodiment 2. In FIG. 4, blocks similar or equivalent to those shown in FIG. 3 are designated by the same numerals, and their descriptions are omitted.

Signals from the microcomputer 310 are input to the first control section 300 in accordance with Embodiment 3 via the photocoupler PD and transmitted to the n discharge devices D1 to Dn. The n discharge devices D1 to Dn individually discharge battery blocks B1 to Bn constituting the assembled battery 10 according to instructions from the microcomputer 310.

The microcomputer 310 searches for a battery block having a high voltage by measuring the voltages of the battery blocks B1 to Bn using a voltage measurement circuit not shown. Then, the microcomputer 310 generates serial data required for discharging the battery block having the high voltage and outputs the serial data as an optical signal to the first control section 300.

The microcomputer 310 has a clock oscillator (not shown) and generates the serial data at the rising edge timing of the clock signal generated by the clock oscillator. FIG. 5 shows examples of the serial data (DATA) and the clock signal (CLK) in the case that the third battery block B3 is discharged. The low level of the serial data is used as a reference. The serial data comprises start bits 501 (6 bits), data bits 502, the number of which is equal to at least the number n of the battery blocks (20 bits in Embodiment 3), and stop bits 503 (6 bits) in this order. In Embodiment 3, the data length of the serial data is 32 bits. The start bits 501 and the stop bits 503 are each used as a High level signal having continuous 6 bits. The data bits 502 become High level at the rising edge timing of the clock signal corresponding to the battery block to be discharged. The output of the clock signal from the microcomputer 310 is not done simultaneously with the output of the serial data.

A rest period (Low level) having a length of 32 bits (the data length of the serial data) or more is provided each time before the microcomputer 310 transmits the serial data or each time the microcomputer 310 transmits a predetermined amount of the serial data. In the case that the Low level period having a length of 32 bits or more continues, the serial input/parallel output register 320 automatically resets its internal counter. In the case that the serial input/parallel output register 320 detects the start bits 501 (6 bits), it automatically resets its internal counter. The internal counter is used to set the timing of loading the serial data to the parallel outputs.

In the case that the number of bits in the data bits is large, it is preferable that a synchronizing signal for performing resynchronization should be inserted at every predetermined number of bits. In the case that the number of bits in the data bits is large, the serial input/parallel output register may have a danger of misreading the rearmost data of the serial data owing to a slight deviation between the clock frequency at which the second control section outputs data and the frequency of the internal clock of the serial input/parallel output register at which the data is read. For example, a synchronizing signal with two bits (1 and 0) is inserted at every 8 data bits. The clock oscillator of the serial input/parallel output register can readjust the timing of the clock signal at the falling edge (from 1 to 0) of the synchronizing signal. Hence, even if the deviation between the clock frequency at which the second control section outputs the data and the frequency of the internal clock of the serial input/parallel output register at which the data is read is up to 5%, the serial input/parallel output register has no danger of misreading the serial data.

The serial data (DATA) output from the microcomputer 310 is transmitted to the first control section 300 via the photocoupler PD.

The first control section 300 comprises the serial input/parallel output register 320 and a level conversion circuit 130.

The serial input/parallel output register 320 has a clock oscillator 321, a data input terminal DATA and parallel output terminals Y1 to Yn, the number of which is equal to the number (n) of the battery blocks B1 to Bn. The serial data from the microcomputer 310 is input to the serial input/parallel output register 320. The serial data from the microcomputer 310 is transmitted to the data input terminal DATA via the collector terminal of the phototransistor constituting the photocoupler PD.

The clock oscillator 321 of the serial input/parallel output register 320 outputs a clock signal that is synchronized at the rising edge of the start bits 501. The oscillation frequency of the clock oscillator 321 is set so as to be identical to the clock frequency at which the microcomputer 310 outputs the serial data.

The serial input/parallel output register 320 detects the falling edge of the clock signal output from the clock oscillator 321 and receives the serial data. The serial input/parallel output register 320 then outputs the respective data bits of the serial data from the parallel output terminals Y1 to Yn at the timing when a predetermined number of bits of data are captured. Among the parallel output terminals Y1 to Yn, only the output terminal corresponding to the battery block to be discharged is switched to High level. For example, in the case that the serial data shown in FIG. 5 is input to the serial input/parallel output register 320, only the output terminal Y3 is switched to High level. The emitter terminal of the phototransistor constituting the photocoupler PD is connected to the negative electrode terminal of the lowest-order battery block B1.

The microcomputer 310 is electrically insulated from the high-voltage assembled battery 10 by the transmission device including the photocoupler PD, the input and output terminals of which are insulated from each other.

As described above, the first control section 300 comprises the serial input/parallel output register 320 having the data input terminal DATA as an input terminal. To the data input terminal DATA, the transmission device, the input and output terminals of which are insulated from each other, is connected. With this configuration, the number of the expensive transmission devices can be reduced significantly in comparison with the conventional example. The number of the expensive transmission devices in the capacity equalizing apparatus in accordance with Embodiment 3 is less by one than that in the capacity equalizing apparatus in accordance with Embodiment 2. The capacity equalizing apparatus in accordance with Embodiment 3 is thus small in size and low in cost in comparison with the capacity equalizing apparatus in accordance with Embodiment 2.

Embodiment 4

Figure 6:
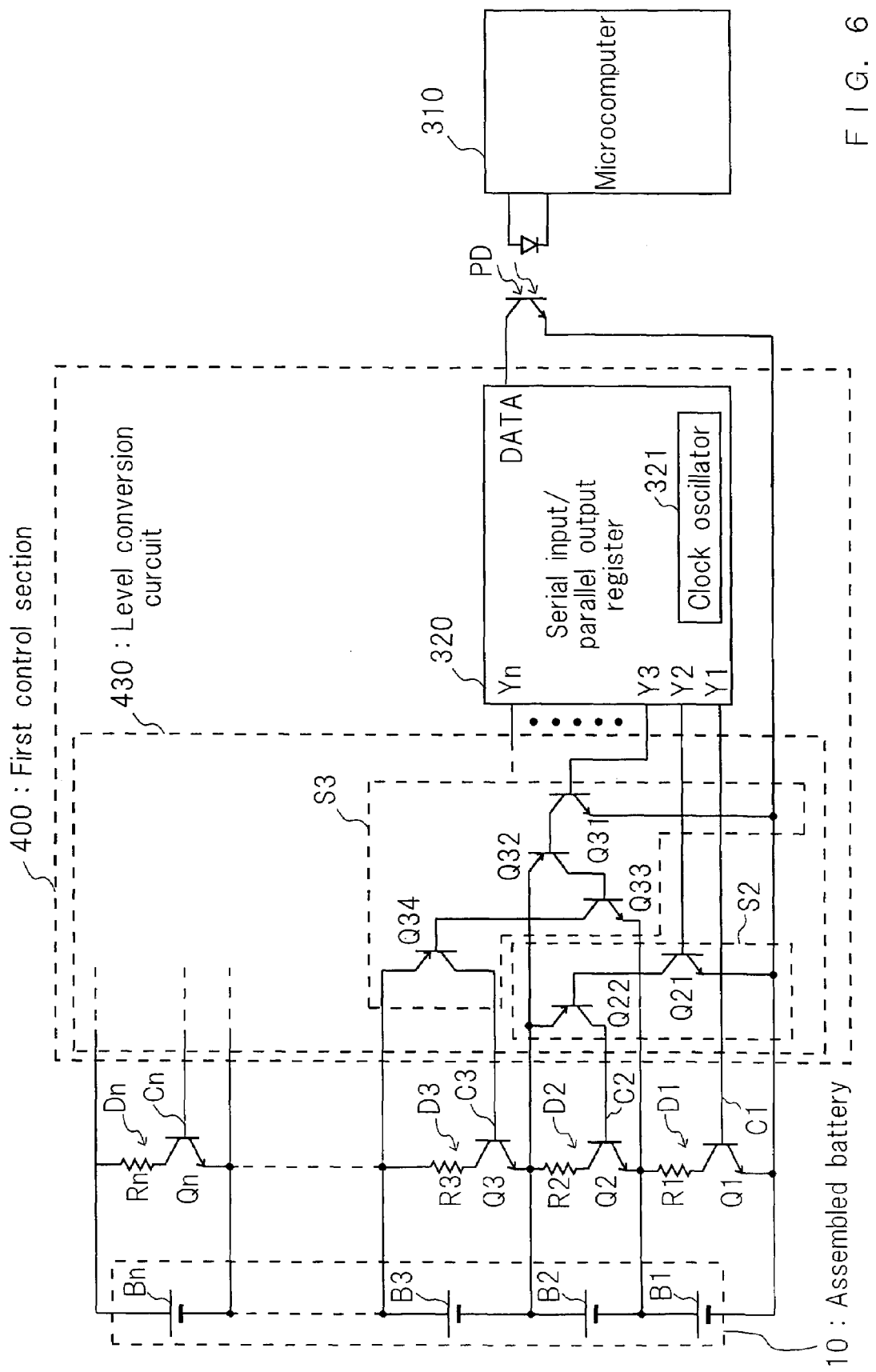
FIG. 6 is a block diagram showing a capacity equalizing apparatus in accordance with Embodiment 4 of the present invention.

A capacity equalizing apparatus in accordance with Embodiment 4 of the present invention will be described using FIG. 6. FIG. 6 is a block diagram showing the capacity equalizing apparatus in accordance with Embodiment 4 of the present invention.

The capacity equalizing apparatus in accordance with Embodiment 4 comprises a microcomputer 310 constituting a second control section serving as a low-voltage circuit, a photocoupler PD, the light-emitting diode and the light-sensitive diode of which are insulated from each other, a first control section 400 serving as a high-voltage circuit, n discharge devices D1 to Dn, and an assembled battery 10. The microcomputer 310 and the first control section 400 constitute a controller. The capacity equalizing apparatus in accordance with Embodiment 4 has a configuration wherein the first control section 300 of the capacity equalizing apparatus in comparison with Embodiment 3 is replaced with the first control section 400. The capacity equalizing apparatus in accordance with Embodiment 4 is installed in an electric vehicle. The DC power of the assembled battery 10 is converted into AC power by an inverter (not shown), and the AC power drives a motor (not shown), whereby the electric vehicle runs. The photocoupler is a transmission device, the input and output terminals of which are insulated from each other.

The capacity equalizing apparatus in accordance with Embodiment 4 has a configuration wherein the level conversion circuit 130 of the capacity equalizing apparatus (FIG. 4) in accordance with Embodiment 3 is replaced with a level conversion circuit 430. In other respects, the configuration is similar to that of the capacity equalizing apparatus in accordance with Embodiment 3. In FIG. 6, blocks similar or equivalent to those shown in FIG. 4 are designated by the same numerals, and their descriptions are omitted.

Signals from the microcomputer 310 are input to the first control section 400 in accordance with Embodiment 4 via the photocoupler PD and transmitted to the n discharge devices D1 to Dn. The n discharge devices D1 to Dn individually discharge battery blocks B1 to Bn constituting the assembled battery 10 according to instructions from the microcomputer 310.

The level conversion circuit 430 will be described below.

The level conversion circuit 430 has level conversion means S2, S3, . . . and Sn. Only the level conversion means S2 and S3 are shown in FIG. 6.

The output terminal Y1 of the serial input/parallel output register 320 is directly connected to the input terminal (the base terminal of an npn transistor Q1) of the discharge device D1.

The level conversion means S2 comprises an npn transistor Q21 and a pnp transistor Q22. The base terminal of the npn transistor Q21 is connected to the output terminal Y2 of the serial input/parallel output register 320 and serves as the input terminal of the level conversion means S2. The emitter terminal of the npn transistor Q21 is connected to the negative electrode terminal of the battery block B1, and the collector terminal thereof is connected to the base terminal of the pnp transistor Q22. The emitter terminal of the pnp transistor Q22 is connected to the positive electrode terminal of the battery block B2. The collector terminal of the pnp transistor Q22 is connected to the input terminal (the base terminal of an npn transistor Q2) of the discharge device D2 and serves as the output terminal of the level conversion means S2.

The level conversion means S3 comprises two pairs of npn and pnp transistors (an npn transistor Q31 and a pnp transistor Q32, and an npn transistor Q33 and a pnp transistor Q34). The base terminal of the npn transistor Q31 is connected to the output terminal Y3 of the serial input/parallel output register 320 and serves as the input terminal of the level conversion means S3. The emitter terminal of the npn transistor Q31 is connected to the negative electrode terminal of the battery block B1, and the collector terminal thereof is connected to the base terminal of the pnp transistor Q32. The emitter terminal of the pnp transistor Q32 is connected to the positive electrode terminal of the battery block B2, and the collector terminal thereof is connected to the base terminal of the npn transistor Q33. The emitter terminal of the npn transistor Q33 is connected to the negative electrode terminal of the battery block B2, and the collector terminal thereof is connected to the base terminal of the pnp transistor Q34. The emitter terminal of the pnp transistor Q34 is connected to the positive electrode terminal of the battery block B3. The collector terminal of the pnp transistor Q34 is connected to the input terminal (the base terminal of the npn transistor Q3) of the discharge device D3 and serves as the output terminal of the level conversion means S3.

In a similar way as described above, the input terminal of the kth level conversion means Sk is connected to the kth output terminal Yk of the serial input/parallel output register 320, and the output terminal thereof is connected to the input terminal (the base terminal of the npn transistor Qk) of the kth discharge device Dk. The level conversion means Sk comprises (k−1) pairs of npn and pnp transistors. Hence, the level conversion circuit 430 comprises n(n−1)/2 npn transistors and n(n−1)/2 pnp transistors. In Embodiment 4, the level conversion circuit 430 has 190 npn transistors and 190 pnp transistors.

The operation of the level conversion means S2 will be described below.

In the case that the signal at the input terminal of the level conversion means S2 is High level, the base terminal voltage of the npn transistor Q21 becomes higher than the emitter terminal voltage (0 V) thereof, and the npn transistor Q21 turns on. Hence, the base terminal voltage of the pnp transistor Q22 lowers to a voltage close to the negative electrode terminal voltage (0 V) of the battery block B1, and the pnp transistor Q22 also turns on. The voltage at the output terminal (the collector terminal of the pnp transistor Q22) of the level conversion means S2 rises to a voltage close to the positive electrode terminal voltage (28.8 V) of the battery block B2. In other words, a state occurs wherein there is an output signal to be output from the level conversion means S2 to the discharge device D2.

In the case that the signal at the input terminal of the level conversion means S2 is Low level, the npn transistor Q21 does not turn on, and no current flows from the base terminal of the pnp transistor Q22 to the negative electrode terminal of the battery block B1. In other words, the pnp transistor Q22 is off, and a state occurs wherein there is no output signal to be output from the level conversion means S2 to the discharge device D2.

As described above, the level conversion means S2 converts the voltage level of the input signal into a voltage level capable of driving the discharge device D2, that is, the voltage level obtained at the positive electrode terminal of the battery block B2 and being used as a reference. The signal is then output to the discharge device D2.

The operation of the level conversion means S3 will be described below.

In the case that the signal at the input terminal of the level conversion means S3 is High level, the base terminal voltage of the npn transistor Q31 becomes higher than the emitter terminal voltage (0 V) thereof, and the npn transistor Q31 turns on. Hence, the base terminal voltage of the pnp transistor Q32 lowers to a voltage close to the negative electrode terminal voltage (0 V) of the battery block B1, and the pnp transistor Q32 also turns on. The base terminal voltage of the npn transistor Q33 rises to a voltage close to the positive electrode terminal voltage (28.8 V) of the battery block B2, and the npn transistor Q33 also turns on. Hence, the base terminal voltage of the pnp transistor Q34 lowers to a voltage close to the negative electrode terminal (14.4 V) of the battery block B2. In other words, a state occurs wherein there is an output signal to be output from the level conversion means S3 to the discharge device D3.

In the case that the signal at the input terminal of the level conversion means S3 is Low level, the npn transistor Q31 does not turn on, and no current flows from the base terminal of the pnp transistor Q32 to the negative electrode terminal of the battery block B1. In other words, the pnp transistor Q32 is off. Similarly, the npn transistor Q33 and the pnp transistor Q34 are also off. In other words, a state occurs wherein there is no output signal to be output from the level conversion means S3 to the discharge device D3.

As described above, in the level conversion means S3, the voltage level of the input signal is converted into a voltage level close to the positive electrode terminal voltage of the battery block B2 by the npn transistor Q31 and the pnp transistor Q32, and further converted into a voltage level close to the positive electrode terminal voltage of the battery block B3 by the npn transistor Q33 and the pnp transistor Q34. The signal is then is output to the discharge device D3. The level conversion means S3 converts the voltage level of the input signal into a voltage level capable of driving the discharge device D3, that is, the voltage level obtained at the positive electrode terminal of the battery block B3 and being used as a reference. The signal is then output to the discharge device D3.

The subsequent level conversion means S4 to Sn also operate similarly. In other words, in the level conversion means Sk, the voltage level of the input signal is raised to the voltage level at the positive electrode terminal of the battery block B2 by the first pair of npn and pnp transistors. Furthermore, the voltage level of the input signal is raised in increments of the voltage (14.4 V) across the terminals of each battery block by the second to (k−1)th pairs of npn and pnp transistors. The voltage level of the output signal of the level conversion means Sk is converted into the level obtained at the positive electrode terminal of the battery block Bk and being used as a reference.

The voltage applied to each of the pnp and npn transistors constituting the level conversion circuit 430 is approximately the voltage (14.4 V) across the terminals of each battery block or approximately twice the voltage (28.8 V). Hence, the level conversion circuit 430 can easily be integrated into an IC using existing semiconductor devices having a withstand voltage of approximately 40 V. With Embodiment 4, it is possible to provide a low-cost and small capacity equalizing apparatus.

In the level conversion means Sk, the voltage level of the input signal is raised in increments of approximately the voltage (14.4 V) across the terminals of each battery block or approximately twice the voltage (28.8 V). However, the increment for the voltage level of the input signal is not limited to this value. Instead of this value, for example, in the high-order level conversion means Sk, the voltage level of the input signal may be raised in increments of approximately twice or three times the voltage across the terminals of the battery block. However, the increment for the voltage level is determined by the trade-off between the withstand voltage level of the pnp and npn transistors constituting the level conversion means Sk and the voltage across the terminals of the battery block. Furthermore, the pnp and npn transistors constituting the level conversion circuit 430 may be replaced with other switching devices.

In the level conversion circuit, a circuit for converting the voltage level of a binary data bit output from at least one of the parallel output terminals into a voltage level capable of on-off controlling the discharge device corresponding to the data bit includes a circuit for converting either one of binary voltages output from the serial input/parallel output register into a first voltage serving as the voltage at the connection point between the ath battery block (a is a positive integer of 2 or more) and the (a+1)th battery block from the reference potential (0 V in Embodiment 4) of the serial input/parallel output register and for further converting the first voltage into a second voltage serving as the voltage at the connection point between the (a+b)th battery block (b is a positive integer of 1 or more) and the (a+b+1)th battery block.

In Embodiments 1 to 4, photocouplers are used to electrically insulate the microcomputers 110, 210 and 310 constituting the second control sections from the first control sections 100, 200, 300 and 400 and the assembled battery 10. However, without being limited to this, it may also possible to use any given transmission devices, the input and output terminals of which are insulated from each other. For example, it is possible to use transformers, the primary and secondary windings of which are insulated from each other. In the case that photocouplers are installed in an electric vehicle, photocouplers, the light-emitting diode and the phototransistor of which are not combined into one unit, are used preferably.

In Embodiment 4, when serial data having a predetermined number of bits is input, the serial input/parallel output register outputs the serial data from the parallel output terminals thereof. However, instead of this, the serial input/parallel output register may output the serial data from the parallel output terminals when the stop bits are input.

In Embodiments 1 to 4, the microcomputers 110, 210, and 310 generate serial data required for discharging one battery block. However, the microcomputers may generate serial data required for simultaneously discharging multiple battery blocks.

The number of cells constituting each battery block may be one or multiple. Each cell of the assembled battery 10 may be a secondary battery capable of being charged and discharged, other than a nickel-hydrogen battery. For example, the assembled battery 10 may be formed of lead-acid batteries, nickel-cadmium batteries or lithium-ion secondary batteries.

In Embodiments 1 to 3, the level conversion circuit 130 may be replaced with the level conversion circuit 430. With this replacement, the first control sections 100, 200, and 300 can be formed of low-cost circuit devices having a low withstand voltage.

In Embodiments 1 to 4, the discharge device Dn comprises the discharge resistor Rn and the npn transistor Qn connected to each other in series. However, it may comprise the discharge resistor Rn and a pnp transistor Qn connected to each other in series.

In Embodiments 1 to 4, the capacity equalizing apparatus is installed in electric vehicles. However, without being limited to this, the capacity equalizing apparatus may be installed in apparatuses other than electric vehicles, such as an apparatus that is driven by using an assembled battery as a power source. In the capacity equalizing apparatus in accordance with the present invention, the larger the number of the battery blocks or cells constituting the assembled battery and the higher the total voltage of the assembled battery, the higher the effect of reducing cost and circuit size.

The capacity equalizing apparatus in accordance with the present invention is useful as a capacity equalizing apparatus for an assembled battery being installed in electric vehicles, such as pure electric vehicles (PEVs), hybrid electric vehicles (HEVs) and hybrid vehicles having fuel cells and secondary batteries.

The disclosure of Japanese Patent Application No. 2004-149067 filed May 19, 2004 including specification, drawings and claims is incorporated herein by reference in its entirety.

Although the present invention has been described with respect to its preferred embodiments in some detail, the disclosed contents of the preferred embodiments may change in the details of the structure thereof, and any changes in the combination and sequence of the component may be attained without departing from the scope and spirit of the claimed invention.

The invention claimed is:

1. A capacity equalizing apparatus for secondary batteries comprising:

an assembled battery having n battery blocks (n is a positive integer of 2 or more), each battery block comprising one or multiple secondary batteries and said battery blocks being connected in series;

n discharge devices, each connected across the positive and negative electrode terminals of each of said battery blocks, for discharging said secondary batteries inside said respective battery blocks; and a controller for individually controlling said discharge devices, wherein said controller has a first control section to which said battery blocks are electrically connected, at least one transmission device having input and output terminals insulated from each other, and a second control section electrically insulated from said first control section by said at least one transmission device, wherein said second control section generates serial data for controlling said n discharge devices and sends said serial data to said first control section via said at least one transmission device, and wherein said first control section includes a serial input/parallel output register for generating, in parallel, n data bits corresponding to said n discharge devices using said serial data.

2. A capacity equalizing apparatus for secondary batteries in accordance with claim 1, wherein said serial data has start bits and said data bits for on-off controlling said discharge devices, and said first control section comprises:

said serial input/parallel output register having a data input terminal to which said serial data is input, multiple parallel output terminals from which said data bits are output and a clock oscillator for generating a clock signal synchronized with said serial data and used for reading at least said data bits among said serial data, and a level conversion circuit for converting the voltage level of each data bit output from each of said parallel output terminals into a voltage level capable of on-off controlling said discharge device corresponding to each data bit and for outputting the voltage-converted signal to the corresponding discharge device.

3. A capacity equalizing apparatus for secondary batteries in accordance with claim 1, wherein said controller comprises:

said serial input/parallel output register having a data input terminal to which said serial data for on-off controlling said discharge devices is input, a reset terminal to which a reset signal for identifying the head of said serial data is input, multiple parallel output terminals from which said data bits are output and a clock oscillator for generating a clock signal synchronized with said serial data and used for reading at least said data bits among said serial data, and a level conversion circuit for converting the voltage level of each data bit output from each of said parallel output terminals into a voltage level capable of on-off controlling said discharge device corresponding to each data bit and for outputting the voltage-converted signal to said corresponding discharge device.

4. A capacity equalizing apparatus for secondary batteries in accordance with claim 1, wherein said controller comprises:

said serial input/parallel output register having a clock signal input terminal to which a clock signal is input, a data input terminal to which said serial data, formed of data synchronized with said clock signal and used for on-off controlling said discharge devices, is input, a reset terminal to which a reset signal for identifying the head of said serial data is input and multiple parallel output terminals from which said data bits are output, and a level conversion circuit for converting the voltage level of each data bit output from each of said parallel output terminals into a voltage level capable of on-off controlling said discharge device corresponding to each data bit and for outputting the voltage-converted signal to said corresponding discharge device.

5. A capacity equalizing apparatus for secondary batteries in accordance with claim 2, wherein said serial data further has stop bits, and said serial input/parallel output register outputs said serial data from said parallel output terminals when said stop bits are input.

6. A capacity equalizing apparatus for secondary batteries in accordance with claim 3, wherein said serial data further has stop bits, and said serial input/parallel output register outputs said serial data from said parallel output terminals when said stop bits are input.

7. A capacity equalizing apparatus for secondary batteries in accordance with claim 4, wherein said serial data further has stop bits, and said serial input/parallel output register outputs said serial data from said parallel output terminals when said stop bits are input.

8. A capacity equalizing apparatus for secondary batteries in accordance with claim 2, wherein a circuit, constituting said level conversion circuit, for converting the voltage level of a binary data bit output from at least one of said parallel output terminals into a voltage level capable of on-off controlling said discharge device corresponding to the data bit, includes a circuit for converting either one of binary voltages output from said serial input/parallel output register into a first voltage serving as the voltage at the connection point between the ath battery block (a is a positive integer of 2 or more) and the (a+1)th battery block from the reference potential of said serial input/parallel output register and for further converting said first voltage into a second voltage serving as the voltage at the connection point between the (a+b)th battery block (b is a positive integer of 1 or more) and the (a+b+1)th battery block.

9. A capacity equalizing apparatus for secondary batteries in accordance with claim 3, wherein a circuit, constituting said level conversion circuit, for converting the voltage level of a binary data bit output from at least one of said parallel output terminals into a voltage level capable of on-off controlling said discharge device corresponding to the data bit, includes a circuit for converting either one of binary voltages output from said serial input/parallel output register into a first voltage serving as the voltage at the connection point between the ath battery block (a is a positive integer of 2 or more) and the (a+1)th battery block from the reference potential of said serial input/parallel output register and for further converting said first voltage into a second voltage serving as the voltage at the connection point between the (a+b)th battery block (b is a positive integer of 1 or more) and the (a+b+1)th battery block.

10. A capacity equalizing apparatus for secondary batteries in accordance with claim 5, wherein a circuit, constituting said level conversion circuit, for converting the voltage level of a binary data bit output from at least one of said parallel output terminals into a voltage level capable of on-off controlling said discharge device corresponding to the data bit, includes a circuit for converting either one of binary voltages output from said serial input/parallel output register into a first voltage serving as the voltage at the connection point between the ath battery block (a is a positive integer of 2 or more) and the (a+1)th battery block from the reference potential of said serial input/parallel output register and for further converting said first voltage into a second voltage serving as the voltage at the connection point between the (a+b)th battery block (b is a positive integer of 1 or more) and the (a+b+1)th battery block.

* * * * *